United States Patent [19]

Larson et al.

[11] Patent Number: 4,936,007

[45] Date of Patent: Jun. 26, 1990

[54] METHOD OF HOLDING A PART FOR FABRICATION

[75] Inventors: Brad W. Larson; Dan Hockersmith, both of Garland; Thomas H. Taylor, Richardson; John M. Bedinger, Garland; Rick Kottman, Dallas; Steve Pebley, Garland, all of Tex.

[73] Assignee: Texas Instruments Incorporated, Dallas, Tex.

[21] Appl. No.: 344,590

[22] Filed: Jul. 11, 1989

Related U.S. Application Data

[62] Division of Ser. No. 140,853, Jan. 5, 1988.

[51] Int. Cl.[5] .................... B23Q 7/04

[52] U.S. Cl. .................... 29/559; 29/281.1

[58] Field of Search .................... 24/16 R, 20; 29/281.1, 29/559; 269/41, 42, 112, 254 R, 254 LS, 286, 305; 294/103.1, 104; 414/226

[56] References Cited

U.S. PATENT DOCUMENTS 3,854,889 12/1974 Lemelson .................... 198/465.1 X 4,036,485 7/1977 Schimmer et al. .................... 269/286

4,703,920 11/1987 Grabbe et al. .................... 269/254 R 4,793,052 12/1988 Ammann et al. .................... 29/559

FOREIGN PATENT DOCUMENTS 2809584 9/1979 Fed. Rep. of Germany .................... 269/41

59-152038 8/1984 Japan .................... 29/559

WO86/07232 12/1986 PCT Int'l Appl. .................... 269/41

*Primary Examiner*—Joseph M. Gorski

*Assistant Examiner*—Andrew E. Rawlins

*Attorney, Agent, or Firm*—René E. Grossman; Melvin Sharp

[57] ABSTRACT

The disclosure relates to a part carrier of universal design wherein a common carrier is provided with a customizing plate secured on a flat surface thereof and exposing a portion of the flat surface. The walls formed between the customizing plate and the flat surface define a reference surface. A clamp having a rigid finger and a resilient finger applies a force to the device being secured to the part carrier wherein the resilient finger forces the device against one reference surface and then deforms as the second finger forces the device into the reference position.

6 Claims, 3 Drawing Sheets

ACTUATOR 26
COVER 16
MAIN SPRING 23
RETAINING SCREWS 8

METHOD OF HOLDING A PART FOR FABRICATION

This is a division of application Ser. No. 140,853, filed Jan. 5, 1988.

BACKGROUND OF THE INVENTION

1. Field of the Invention

This invention relates to a tooling system for use in conjunction with the manufacture of microwave devices and, more specifically, to the manufacture of microwave hybrid devices.

2. Brief Description of the Prior Art

The assembly of microwave devices typically requires a diverse set of custom tools. This is because products vary greatly in size and shape and because assembly machines have differing requirements.

In the prior art, hybrid microwave devices have generally been handled individually during fabrication. Each product was removed from a storage box, fixtured to a process machine and returned to the storage box after processing. The problems encountered in moving microwave products being fabricated in this manner were that handling damage occurred due to the fragile nature of the devices and that tooling costs were always high because each tool was generally a new and unique design. Furthermore, it was not feasible to automate material handling of microwave products through the assembly process. It is therefore apparent that there has been a need to provide tooling for use in fabrication of microwave devices which are usable for manufacture of many different parts and which can also be used in conjunction with a maximum number of processing steps to minimize removal from the fixture or tool.

SUMMARY OF THE INVENTION

In accordance with the present invention, the above noted problems of the prior art are minimized in that the requirement for storage containers for storing microwave parts under manufacture between manufacturing steps is substantially eliminated, automated material handling is facilitated by protecting fragile parts in a durable tool and providing a consistent shape for automated mechanisms to grip and by reduction in the labor required to fixture parts to processing machines. To achieve these benefits, microwave parts are stored in carrier tools between process steps. It is a potential disadvantage of this system that, if inventory builds up between process steps, more tools will be needed to store the parts. Carrier tools are more expensive than the parts boxes used in the prior art. Therefore, it is important to control inventory build up between process steps to prevent the need for additional carrier tools.

Briefly, in accordance with the present invention, the above is accomplished by providing a system of tooling developed specifically for microwave hybrid products. The purpose of the tooling is to allow a group of products to be fixtured on one item of tooling referred to herein as a "carrier tool" or a "common carrier" to be removed only after assembly is complete, and to standardize tooling components.

Because fragile parts are protected by the carrier as they are moved from process to process, handling damage is reduced. Because products are handled by arrays rather than individually, machine set up time is reduced.

The common exterior features of the tool allow the tool to be moved by automated means from one machine to another. Each machine is fitted with an interface which mates with the common exterior features of the carrier.

A specialized clamp to hold products in the carrier is provided which can be widely applied to the microwave hybrid products to be fabricated.

The invention accordingly is a tooling system which allows parts to move across all assembly process machines while being fixtured to one carrier tool and features, as common elements, a carrier tool geometry which comprehends all physical requirements for all assembly machines, a special clamp designed specifically to meet multiple requirements for fixturing microwave hybrid products and a common method of attaching the carrier tools to assembly process machines.

The tooling system in accordance with the present invention includes a machine interface which is of standard design which interfaces with any number of from a few to all of the processing machines of the processing system. A carrier tool is secured to the machine interface so that it is always lined up with the machine interface in known position to permit accurate operation on products thereon at each processing machine of the system, yet is immediately securable to the machine via the machine interface. The carrier tool is of either a standard design for use with a multitude of different hybrid microwave products or of specialized or dedicated design wherein only one or a small number of particular products can be carried thereon, but in larger number than in the case of the standard design carrier which can be used with a much larger range of products.

In the standard design, the microwave devices to be fabricated are accurately positioned on the carrier tool by means of removable customizing plates which are secured to the carrier, the customizing plates being customized for a particular microwave device. The microwave device to be fabricated or worked upon is secured to the carrier by means of the customizing plate and a specialized clamp. This is accomplished by providing plural regions on the carrier which are defined by cut out regions in the customizing plate. The microwave device upon which work is to be performed is placed into the cut out region of the customizing plate and a clamp of design to be discussed hereinbelow applies a force to the microwave device which first forces the device against a first reference surface of the cut out region and then against a second adjacent reference surface of the cut out region to secure the device against these adjacent surfaces. The reference surfaces of the dedicated carrier are integral with and formed directly on the tool surface and require no additional plates.

The clamp is secured in the carrier at about a forty-five degree angle to the device being fabricated or worked upon and includes a plunger portion, the plunger portion being formed of a high temperature resistant material, preferably VESPEL, a polyimid sold by duPont. The plunger includes a pair of forwardly extending generally parallel fingers, one finger being rigid and the other finger being relatively flexible. The reason for this arrangement is that, if both fingers were rigid, then if one finger contacted the device first, the part would bind against the wall unless there were mechanical perfection. To allow for tolerances, one finger contacts the device first, pushing it against a first reference surface, then that finger deforms or flexes as the rigid finger pushes the device against the second reference surface. Accordingly, there is a defined soft positioning against a first reference surface and then hard positioning against a second reference surface whereby the two reference surfaces now define the final position of the microwave device.

The clamp includes a return spring for maintaining the plunger in a position away from the microwave device and a main spring to force the spring against the device. When the clamp moves against the device, the fingers move the device against the reference surfaces until the relatively flexible finger deflects and thereby permits the part to be seated against the two adjacent surfaces. In this manner, the device is secured for storage as well as for location in processing machines without removal from the carrier. In addition, since the carrier is of substantially universal design, it can be reused alone or in conjunction with a customizing plate with large number of parts. Furthermore, since a standard interface is used, the combination of interface and carrier can be moved from machine to machine without disturbing the part being fabricated.

DESCRIPTION OF THE PREFERRED EMBODIMENTS

Figures 1, 2, 3, 4:
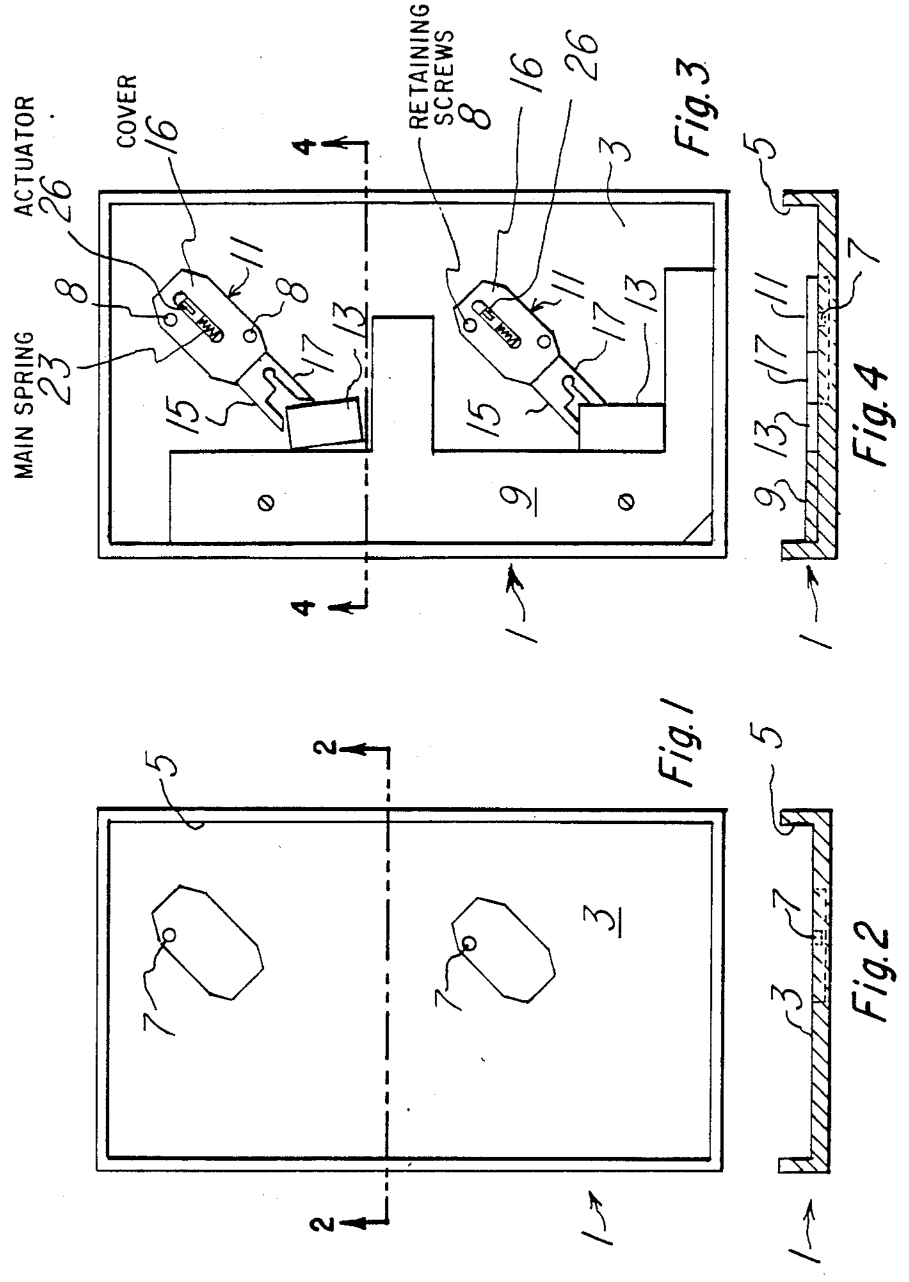
FIG. 1 is a top view of a carrier in accordance with the present invention.
FIG. 2 is a cross-sectional view taken along the line 2—2 of FIG. 1.
FIG. 3 is a top view as in FIG. 1 showing the customizing plate, clamp and microwave device.
FIG. 4 is a cross-sectional view taken along the line 4—4 of FIG. 3.

Referring first to FIGS. 1 and 2, there is shown a carrier 1 of standard design in accordance with the present invention. The carrier is formed of rigid metal which does not build up internal stresses and has high heat conductivity for quick thermal response, such as, for example, cast aluminum (6000 series) and has a base portion 3 and side walls 5 therearound. Also shown is a clamp pocket 7 for receiving a clamp mechanism 11 (FIG. 3). The clamp mechanism 11 is secured by retaining screws 8 to the carrier base 3, the clamp mechanism being of preferably special design which will be discussed in detail hereinbelow. The carrier 1 is of generally universal design whereby, alone or in conjunction with a customizing plate 9 (FIG. 3) of special design, it can be used with a wide range of parts, thereby providing the economic advantage of small inventory and the time advantage of having a carrier available for new parts rather than the present requirement of manufacturing a unique carrier for each part.

Referring now to FIGS. 3 and 4, there is shown the carrier of FIGS. 1 and 2 with a customizing plate 9 disposed over a portion of the base portion 3 with a portion of the base portion 3 being exposed as shown. The customizing plate 9 is preferably formed of aluminum for quick thermal response and light weight and fits snugly within the side walls 5. The clamp 11, which has a rigid finger 15 and a resilient finger 17 is secured to the carrier plate clamp pockets 7 and, when actuated, secures the device to be processed 13 on the carrier and against the customizing plate as will be explained hereinbelow.

Referring now to FIG. 5 there is shown the clamp 11 in greater detail with its operation being described in conjunction therewith. The clamp 11 is secured in the clamp pocket 7 by retaining screws 8 and includes a plunger 21 having the fingers 15 and 17 extending therefrom, a main spring 23, a return spring 25 and a cover 16 through which retaining screws 8 extend. The retaining screws 8 are secured to the base 3 of the member 1 to retain the clamp 11 in place.

Figure 5A:
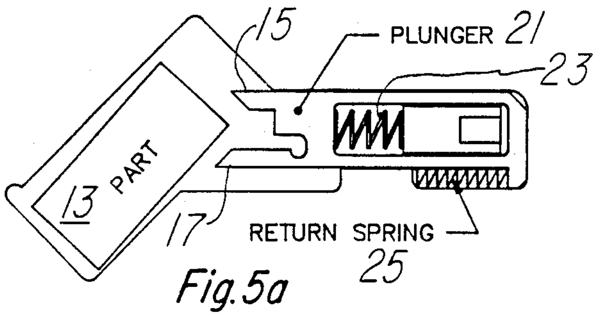
FIG. 5A to 5G shows the structure and operation of the clamp.
Figure 5C:
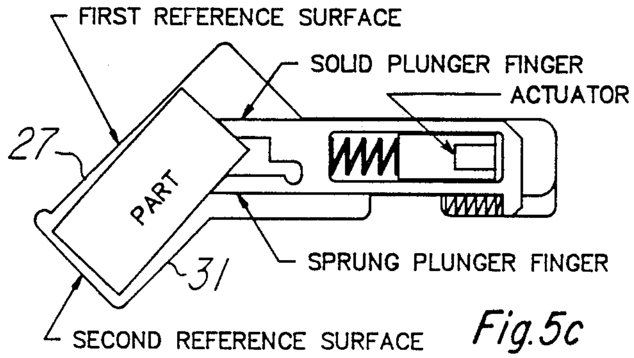
Figure 5B:
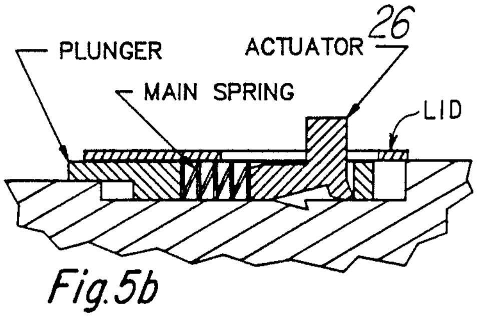

In operation, as shown in FIG. 5A, the customizing plate 9 is disposed on the carrier 1 and secured thereto over the base 3. The device to be operated upon 13 is disposed in one of the regions whereat the base portion 3 is exposed. The clamp 11 is in the rest position at this time with the plunger 21 and fingers 15 and 17 thereon in the retracted position. In this condition, the main spring 23 is in compression and the return spring 25 is in expansion. The actuator 26 is first pushed forwardly and downwardly, the actuator, main spring 23 and plunger 21 moving together with no appreciable deflection of the main spring as shown in FIG. 5B. The plunger fingers contact the device 13, moving it into position, generally first against the wall 27 as shown in FIGS. 5C and 5D and then against the wall 29 of the customizing plate 9 as shown in FIG. 5E, these walls acting as the reference surfaces for accurately positioning and aligning the device for accurate operation thereon as shown in FIG. 5E.

Figure 5D:
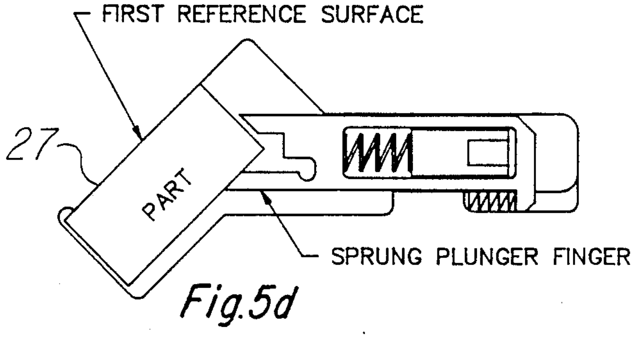
Figure 5E:
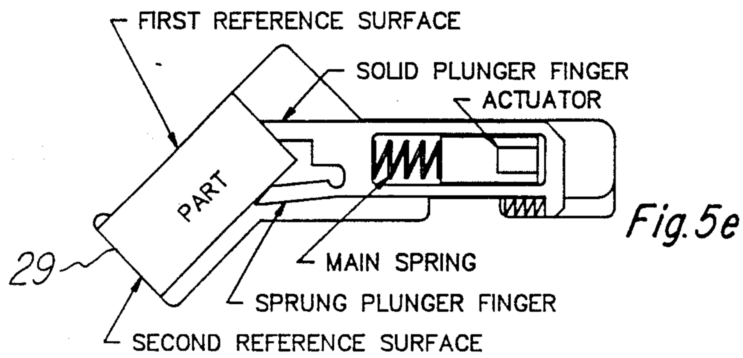
Figure 5F:
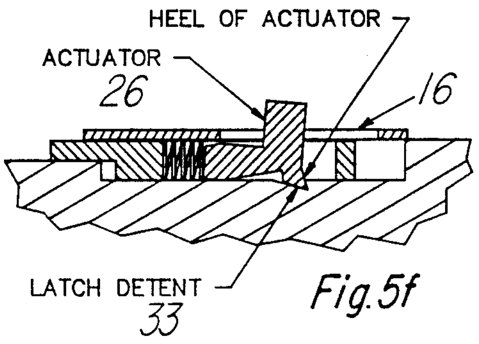
Figure 5G:
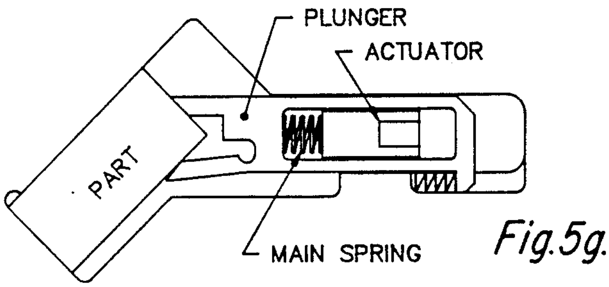

More specifically, the resilient finger 17 seats the device 13 against the first reference surface 27 of the customizing plate 9 as shown in FIG. 5D. Further compression of the main spring 21 by the actuator 25 drives the rigid finger 15 against the device 13, seating the device against the second reference surface 29 of the customizing plate 9. The resilient finger 17 deflects due its resilient nature to allow the rigid finger 15 to seat against the device 13 as shown in FIG. 5E. The heel of the actuator 26 now falls into and seats in the latch detent 33 as shown in FIG. 5F. In this condition, the plunger 21 and fingers 15 and 17 thereon are driven against the device 13 by the main spring 23 with the latch actuator 26 holding the main spring compressed. The device 13 is clamped accurately in position against the reference surfaces 27 and 29 by the fingers 15 and 17 with the resilient finger 17 being somewhat deflected to provide the required force against the device 13.

It can be seen that the device 13 is locked on the carrier 1 against the reference surfaces 27 and 29 and is therefore accurately positioned for operation thereon. The carrier 1 will now be clamped in a universal interface (not shown) for insertion into machines for operation on the device or for storage of the device prior to performing additional operations thereon.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A method of carrying a part for fabrication comprising the steps of:

(a) providing a flat surface;

(b) providing a reference surface extending normal to said flat surface and secured thereto;

(c) providing a clamp secured relative to said flat surface, said clamp having first and second fingers, one of said fingers being rigid and the other of said fingers being resilient with respect to a part to be carried;

(d) contacting said part with said rigid and resilient fingers;

(e) moving a first portion of said part against said reference surface my means of said fingers; and (f) moving a second portion of said part against said reference surface by means of said rigid finger alone, whereby, said resilient finger deflects due to force generated by said resilient finger contacting said part to permit final location and securement of said part via said rigid finger.

2. The method of claim 1 further including placing a customizing plate on said flat surface, sidewalls of said customizing plate defining said reference surface.

3. A method as set forth in claim 1, further including the step of providing a wall secured to said flat surface and providing a customizing plate of predetermined shape secured within said wall, covering a portion of said flat surface, said customizing plate defining said reference surface.

4. A method as set forth in claim 1 further including the step of attaching the flat surface to a processing machine.

5. A method as set forth in claim 2 further including the step of attaching the flat surface to a processing machine.

6. A method as set forth in claim 3 further including the step of attaching the flat surface to a processing machine.

* * * * *